US011288566B2

(12) United States Patent
Liu et al.

(10) Patent No.: US 11,288,566 B2
(45) Date of Patent: Mar. 29, 2022

(54) BUILDING A GOSSIP GROUP OF DOMAIN-SPECIFIC CHATBOTS

(71) Applicant: INTERNATIONAL BUSINESS MACHINES CORPORATION, Armonk, NY (US)

(72) Inventors: Chih-Hsiung Liu, Taipei (TW); Li-Feng Tseng, Taipei (TW)

(73) Assignee: International Business Machines Corporation, Armonk, NY (US)

(*) Notice: Subject to any disclaimer, the term of this patent is extended or adjusted under 35 U.S.C. 154(b) by 869 days.

(21) Appl. No.: 15/993,686

(22) Filed: May 31, 2018

(65) Prior Publication Data
US 2019/0370629 A1 Dec. 5, 2019

(51) Int. Cl.
G06N 3/00 (2006.01)
H04L 51/02 (2022.01)
G06F 40/30 (2020.01)
G06N 20/00 (2019.01)

(52) U.S. Cl.
CPC ............. *G06N 3/006* (2013.01); *G06F 40/30* (2020.01); *H04L 51/02* (2013.01); *G06N 20/00* (2019.01)

(58) Field of Classification Search
CPC ......... G06F 40/30; H04L 51/02; G06N 20/00; G06N 3/006
USPC .......................................................... 706/11
See application file for complete search history.

(56) References Cited

U.S. PATENT DOCUMENTS

| 7,644,057 | B2 | 1/2010 | Nelken et al. | |
|---|---|---|---|---|
| 2011/0078159 | A1* | 3/2011 | Li | G06F 16/24534 707/749 |
| 2014/0164476 | A1 | 6/2014 | Thomson | |
| 2016/0063126 | A1 | 3/2016 | Nelken et al. | |
| 2017/0169101 | A1 | 6/2017 | Walia et al. | |

(Continued)

FOREIGN PATENT DOCUMENTS

WO 2016198952 12/2016

OTHER PUBLICATIONS

Sivaraj, Amanda; Building a Bot to Answer FAQs: Predicting Text Similarity; URL: http://www.kdnuggets.com/2017/03/bot-answer-faqs-predicting-text-similarity.html; retrieved from the Internet Jul. 5, 2017; 7 pages.

(Continued)

*Primary Examiner* — Sherrod L Keaton
(74) *Attorney, Agent, or Firm* — Schmeiser, Olsen & Watts; David Mattheis

(57) ABSTRACT

An approach is provided for domain-specific chatbots that employ distributed natural language classifiers (NLCs). A NLC included in a first chatbot is executed, which generates a first intent of a question and a first confidence that the first intent is an actual intent of the question. Based on a determination that the first confidence does not exceed a threshold, the question is broadcasted to other chatbots. A second confidence that a second intent is an actual intent is received from a second chatbot in response to the broadcast, and is determined to exceed the threshold. An association among the question, the second chatbot, the second confidence, and the second intent is stored in a memory cache included in the first chatbot. A response to the question is generated based on the second intent. The response is presented to a user from the first chatbot.

17 Claims, 6 Drawing Sheets

(56) References Cited

U.S. PATENT DOCUMENTS

| | | | | |
|---|---|---|---|---|
| 2018/0181558 A1* | 6/2018 | Emery | ................ | H04M 3/4936 |
| 2018/0337872 A1* | 11/2018 | Fawcett | .................... | G06F 8/31 |
| 2018/0358006 A1* | 12/2018 | McConnell | ......... | G06F 16/3329 |
| 2019/0108836 A1* | 4/2019 | Kato | ....................... | G10L 15/22 |
| 2021/0124555 A1* | 4/2021 | Davlos | ................. | G06F 3/0481 |

OTHER PUBLICATIONS

How to be sure the chatbot replies correctly in conversations?; URL: https://www.giosg.com/find-answers/how-to-be-sure-the-chatbot-replies-correctly-in-conversations; retrieved from the Internet Jul. 5, 2017; 3 pages.

Mell, Peter et al.; "The NIST Definition of Cloud Computing;" National Institute of Standards and Technology; Special Publication 800-145; Sep. 2011; 7 pages.

Van Der Maaten, Laurens; t-SNE; https://tvdmaaten.github.io/tsne; retrieved from the Internet; Apr. 13, 2018; 5 pages.

\* cited by examiner

| Question | Sentence Vector | Owner | Confidence | Intent |
|---|---|---|---|---|
| What is the weather today? | <10,27,4,100,39,...> | Bot A | 0.8 | ASK_WEATHER |
| How long does it take to fly from Taipei to Beijing? | <8,11,46,30,209,...> | Bot B | 0.6 | ASK_TRANSPORTATION_TIME |
| What is the exchange rate between the US dollar and Yen? | <99,21,55,60,22,...> | Bot C | 0.9 | ASK_EXCHANGE_RATE |
| What is your name? | <42,71,4,120,37,...> | SELF | 0.8 | CHITCHAT |

BUILDING A GOSSIP GROUP OF DOMAIN-SPECIFIC CHATBOTS

BACKGROUND

The present invention relates to managing results from natural language classifiers, and more particularly to building a network of domain-specific natural language classifiers.

A chatbot is a computer program which converses with humans via auditory or textual methods in a manner that simulates human-to-human conversation. Chatbots are used in conversational agents that perform practical tasks such as providing customer service or acquiring information. Chatbots may use natural language processing (NLP) systems and may be accessed via virtual assistants, messaging apps, or organizations' apps and websites. Building a chatbot includes understanding the user's intent associated with the user's question and generating an accurate response to the question. Known techniques for building chatbots include using natural language classifiers (NLCs) as a critical technology for identifying the intent and entities of users' natural language queries (i.e., utterances). A developer may generate responses to the queries based on predefined response templates. A NLC employs cognitive computing techniques to determine best matching predefined classes for short text inputs, such as a sentence or phrase. A NLC has the ability to classify phrases that are expressed in a natural language into categories.

SUMMARY

In one embodiment, the present invention provides a method of building a network of domain-specific chatbots that employ distributed natural language classifiers. The method includes a computer executing a first natural language classifier included in a first chatbot included in a group of chatbots, which generates (i) a first intent of a question received as natural language input from an application utilized by a user to the first chatbot and (ii) a first amount of confidence that the first intent is an actual intent of the question. The method further includes determining that the first amount of confidence does not exceed a threshold amount of confidence. The method further includes based on the first amount of confidence not exceeding the threshold amount, the computer broadcasting the question to other chatbots included in the group of chatbots. The method further includes in response to the step of broadcasting, the computer receiving intents of the question and respective amounts of confidence that the intents are the actual intent from the other chatbots. The intents and the amounts of confidence include a second intent and a second amount of confidence received from a second chatbot included in the group of chatbots. The method further includes the computer determining that the second amount of confidence exceeds the threshold amount of confidence, and in response, (i) storing an association among the question, the second chatbot, the second amount of confidence, and the second intent in a memory cache included in the first chatbot, (ii) generating a response to the question based on the second intent, and (iii) presenting the response to the user from the first chatbot.

In another embodiment, the present invention provides a computer program product for building a network of domain-specific chatbots that employ distributed natural language classifiers. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes the computer system executing a first natural language classifier included in a first chatbot included in a group of chatbots, which generates (i) a first intent of a question received as natural language input from an application utilized by a user to the first chatbot and (ii) a first amount of confidence that the first intent is an actual intent of the question. The method further includes the computer system determining that the first amount of confidence does not exceed a threshold amount of confidence. The method further includes based on the first amount of confidence not exceeding the threshold amount, the computer system broadcasting the question to other chatbots included in the group of chatbots. The method further includes in response to the step of broadcasting, the computer system receiving intents of the question and respective amounts of confidence that the intents are the actual intent from the other chatbots. The intents and the amounts of confidence include a second intent and a second amount of confidence received from a second chatbot included in the group of chatbots. The method further includes the computer system determining that the second amount of confidence exceeds the threshold amount of confidence, and in response, (i) storing an association among the question, the second chatbot, the second amount of confidence, and the second intent in a memory cache included in the first chatbot, (ii) generating a response to the question based on the second intent, and (iii) presenting the response to the user from the first chatbot.

In another embodiment, the present invention provides a computer system including a central processing unit (CPU); a memory coupled to the CPU; and a computer readable storage device coupled to the CPU. The storage device includes instructions that are executed by the CPU via the memory to implement a method of building a network of domain-specific chatbots that employ distributed natural language classifiers. The method includes the computer system executing a first natural language classifier included in a first chatbot included in a group of chatbots, which generates (i) a first intent of a question received as natural language input from an application utilized by a user to the first chatbot and (ii) a first amount of confidence that the first intent is an actual intent of the question. The method further includes the computer system determining that the first amount of confidence does not exceed a threshold amount of confidence. The method further includes based on the first amount of confidence not exceeding the threshold amount, the computer system broadcasting the question to other chatbots included in the group of chatbots. The method further includes in response to the step of broadcasting, the computer system receiving intents of the question and respective amounts of confidence that the intents are the actual intent from the other chatbots. The intents and the amounts of confidence include a second intent and a second amount of confidence received from a second chatbot included in the group of chatbots. The method further includes the computer system determining that the second amount of confidence exceeds the threshold amount of confidence, and in response, (i) storing an association among the question, the second chatbot, the second amount of confidence, and the second intent in a memory cache included in the first chatbot, (ii) generating a response to the question based on the second intent, and (iii) presenting the response to the user from the first chatbot.

Embodiments of the present invention provide a network of knowledge domain-specific NLCs, where memory cache mechanisms in each NLC reduce the latency required to invoke a classifier. Sentence vectors and dimension reduction provide an efficient question string comparison mechanism.

DETAILED DESCRIPTION

Overview

Embodiments of the present invention build a network (i.e., gossip group) of natural language classification agents in enhanced chatbots, where each of the agents owns a subset of domain knowledge. Each agent trains a NLC model of its own subset of domain knowledge, either via a local NLP engine or via a cloud NLC application programming interface (API). In response to receiving a new user query, the agent uses its own NLC model to perform natural language classification. If the classification confidence is below a predetermined threshold, the agent forwards the query to other agents of the same gossip group. The agent receives potential responses from the other agents and selects one of the responses as the one with the greatest classification confidence. For each agent, there is a local memory cache that tracks each natural language classification result, either from its local NLC model or from a response generated by another agent in the group. For a new query, embodiments of the present invention leverage the local memory cache to determine if there is a similar entry already stored in the cache. A novel and efficient technique for determining sentence similarity may be employed.

Known chatbots suffer from scalability, reusability, and interoperability limitations. A production chatbot may contain over 10,000 training utterances that map to over one hundred intention classifications, which is a scale that is difficult to manage. At this scale, the accuracy of the NLC is deficient because the chatbot is not able to clearly tell the difference between the classes. The knowledge of a chatbot is built from scratch by putting training samples from various domains into classes of one NLC, thereby preventing a chatbot from focusing on knowledge of a specific domain. For chatbots to communicate, there is no standard that directs the exchange of information with a standard format. Embodiments of the present invention provide a system that utilizes enhanced chatbots that overcome the unique challenges described above, including addressing the aforementioned scalability issues by employing both local memory caches and distributed domain knowledge.

System for Building a Network of Domain-Specific Chatbots

Figure 1:
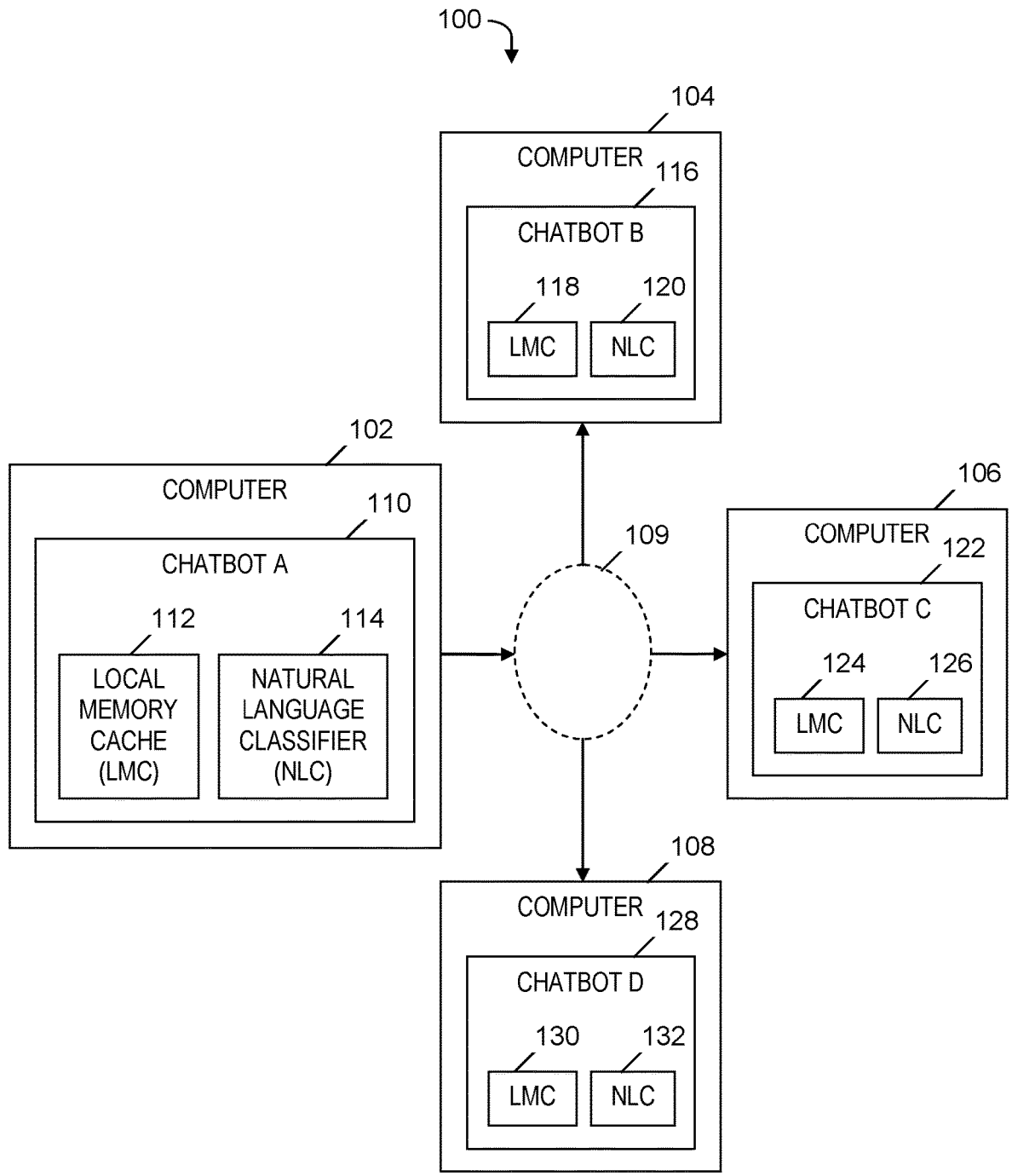
FIG. 1 is a block diagram of a system for building a network of domain-specific chatbots that employ distributed natural language classifiers, in accordance with embodiments of the present invention.

FIG. 1 is a block diagram of a system 100 for building a network of domain-specific chatbots that employ distributed natural language classifiers, in accordance with embodiments of the present invention. System 100 includes computers 102, 104, 106, and 108, which are in a single gossip group and in communication with each other via a gossip messaging bus 109. Computer 102 includes a chatbot 110 (i.e., chatbot A), which includes a local memory cache (LMC) 112 and a natural language classifier (NLC) 114. Computer 104 includes a chatbot 116 (i.e., chatbot B), which includes a LMC 118 and a NLC 120. Computer 106 includes a chatbot 122 (i.e., chatbot C), which includes a LMC 124 and a NLC 126. Computer 108 includes a chatbot 128 (i.e., chatbot D), which includes a LMC 130 and a NLC 132.

The NLCs 114, 120, 126, and 132 are software agents which are components that are local to computer 102, 104, 106, and 108, respectively. Alternatively, each of the NLCs 114, 120, 126, and 132 may be a cloud-based API.

Chatbot 110 receives a question provided by a user. If a response to the question cannot be retrieved locally from LMC 112 and LMC 112 is empty, chatbot 110 broadcasts the question to peer chatbots in its gossip group (i.e., broadcasts the question to chatbots 116, 122, and 128). In response to a broadcast to the peer chatbots, chatbot 110 receives a natural language classification result from one of NLCs 120, 126, and 132 via gossip messaging bus 109 and chatbot 110 stores the result in LMC 112.

As system 100 processes more user questions over time, the chatbots 110, 116, 122, and 128 become subject matter experts (SMEs) whose expertise in a particular knowledge domain is known to each of the chatbots 110, 116, 122, and 128. As SMEs, chatbots 110, 116, 122, and 128 focus on providing results for questions of specific, respective knowledge domains.

LMCs 112, 118, 124, and 130 provide an effective memory cache mechanism that reduces the latency required to invoke a particular NLC from among NLCs 114, 120, 126, and 132. Each of LMCs 112, 118, 124, and 130 also provide a routing table to route a newly received question to a particular chatbot in the gossip group that is recognized as a SME for the knowledge domain of the new question. That is, the routing table associates a question similar to the newly received question with a particular chatbot because that chatbot previously used its local NLC to provide an intent classification of the similar question with a confidence that exceeded a threshold amount of confidence. For a question that is new to the chatbot that receives the question, none of the locally cached intent classifications are used as the intent classification of the new question; instead, the chatbot that received the question directs the question to a peer chatbot that is recognized as the SME for the question.

In one embodiment, each entry in each of the LMCs 112, 118, 124, and 130 includes (i) a question, (ii) a sentence vector derived from the question, (iii) an identification of the owner; i.e., the chatbot 110, 116, 122, or 128 that executed its local NLC to determine an intent classification of the question, where the amount of confidence that the intent classification is accurate exceeds a threshold amount, (iv) the amount of confidence that the intent classification of the question is accurate, and (v) the intent classification determined by the execution of the NLC local to the owner.

Each of the LMCs 112, 118, 124, and 130 includes every intent classification received by the chatbot that includes the LMC, as long as the amount of confidence in the intent classification exceeds the predefined threshold amount of confidence, and regardless of whether the intent classification is the result of the chatbot executing its own local NLC or the result of a peer chatbot executing the peer chatbot's local NLC.

In one embodiment, as new training data is added to chatbot 110, 116, 122, or 128, intent classifications stored in the respective LMC 112, 118, 124, or 130 which were generated by a local NLC (i.e., the intent classifications that are associated with the owner indicated by "SELF" in the LMC) are flushed out of the LMC in response to the local NLC model being rebuilt.

In one embodiment, for each intent classification generated by peer chatbot, a configurable expiration timer in each of chatbots 110, 116, 122, and 128 determines a period of time that the intent classification is permitted to be stored in the respective LMC 112, 118, 124, or 130.

Although system 100 includes four computers, other numbers of computers are contemplated in other embodiments. In one embodiment, a variation of system 100 includes N computers that include N respective chatbots that each share the functionality described herein, where N is an integer greater than or equal to two.

The functionality of the components shown in FIG. 1 is described in more detail in the discussion of FIG. 2, FIG. 3, FIG. 4, FIG. 5, FIG. 6, and FIG. 7 presented below.

Process for Building a Network of Domain-Specific Chatbots

Figure 2:
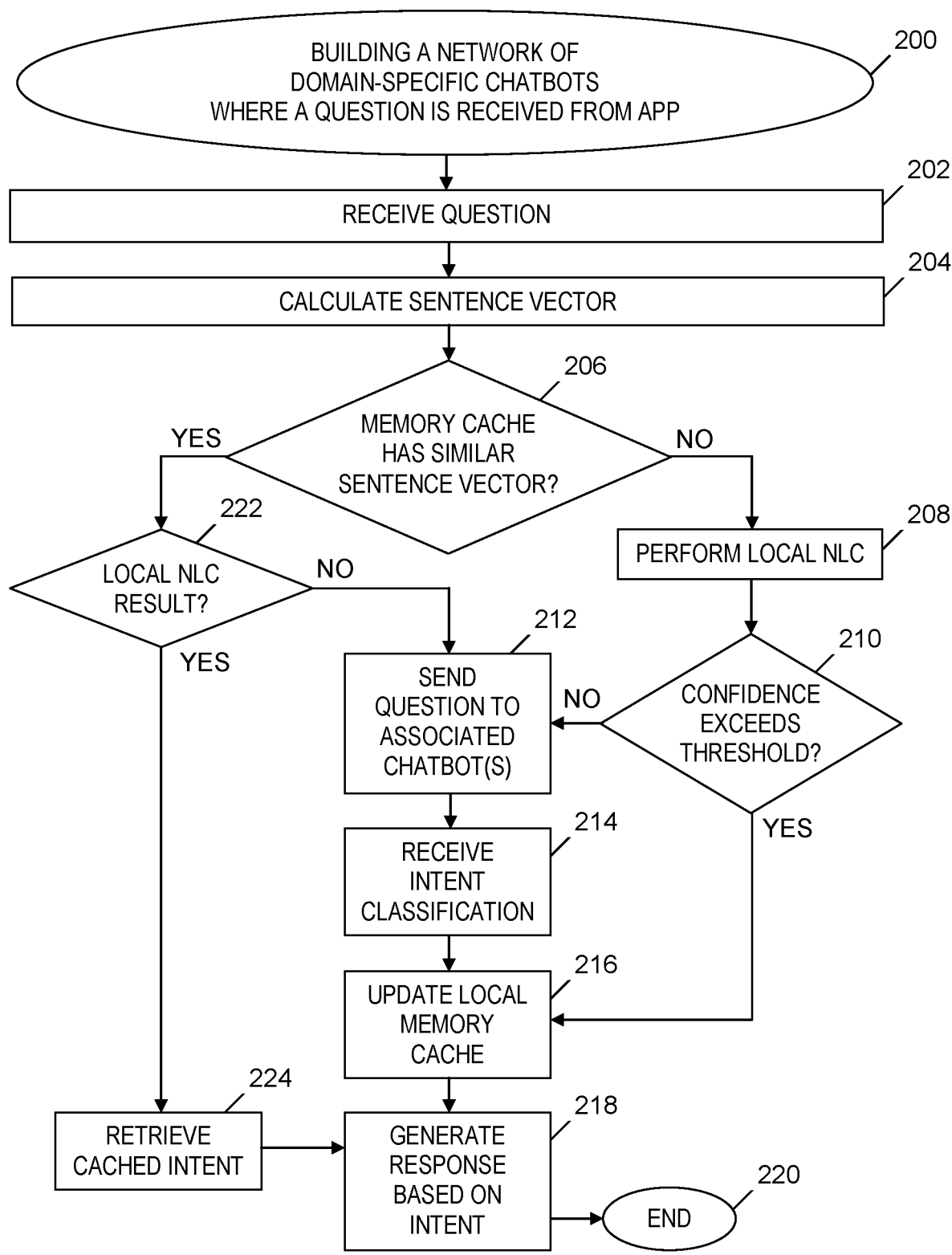
FIG. 2 is a flowchart of a process of building a network of domain-specific chatbots by receiving a question from an application, where the process is implemented in the system of FIG. 1, in accordance with embodiments of the present invention.

FIG. 2 is a flowchart of a process of building a network of domain-specific chatbots by receiving a question from an application, where the process is implemented in the system of FIG. 1, in accordance with embodiments of the present invention. The process of FIG. 2 begins at step 200. In step 202, chatbot 110 (see FIG. 1) receives a question provided by a user via as software application (i.e., an app). Hereinafter, in the discussion of FIG. 2, the question received in step 202 is also referred to simply as "the question."

In step 204, chatbot 110 (see FIG. 1) calculates a word vector for the question and then calculates a sentence vector for the question based on the word vector. In one embodiment, chatbot 110 (see FIG. 1) uses word embedding to calculate the sentence vector as a vector of real numbers that are mapped to words and/or phrases in the question.

In step 206, chatbot 110 (see FIG. 1) determines whether local memory cache 112 (see FIG. 1) includes an entry that has a sentence vector that matches (i.e., is similar to) the sentence vector calculated in step 204.

In one embodiment, chatbot 110 (see FIG. 1) uses word embedding to change the string that comprises the question to a word vector and then to a sentence vector, which is a high dimension vector (e.g., a vector having four or five dimensions). Chatbot 110 (see FIG. 1) transforms the high-dimensioned sentence vector to a two-dimensional vector using a dimension reduction technique. In one embodiment, the dimension reduction technique is the t-Distributed Stochastic Neighbor Embedding (t-SNE) dimensionality reduction technique. Chatbot 110 (see FIG. 1) employs the aforementioned word embedding and dimension reduction techniques to generate two-dimensional vectors representing the questions stored in LMC 112 (see FIG. 1).

For each chatbot in the gossip group, chatbot 110 (see FIG. 1) determines a corresponding average of the two-dimensional sentence vectors associated with that chatbot. Chatbot 110 (see FIG. 1) calculates distances between the two-dimensional sentence vector representing the question and each of the averages determined for the chatbots in the gossip group. If chatbot 110 (see FIG. 1) determines that none of the aforementioned distances are less than a predetermined threshold distance, then chatbot 110 (see FIG. 1) determines that no entry in LMC 112 (see FIG. 1) has a question whose sentence vector matches (i.e., is similar to) the sentence vector calculated in step 204, the No branch of step 206 is followed, and step 208 is performed.

In step 208, chatbot 110 (see FIG. 1) performs a local natural language classification by executing NLC 114 (see FIG. 1). Step 208 includes chatbot 110 (see FIG. 1) employing a NLC model associated with chatbot 110 (see FIG. 1) to perform a natural language classification of the question received in step 202, which determines an intent classification of the question and determines an amount (i.e., a measure) of confidence that the intent classification is accurate.

In step 210, chatbot 110 (see FIG. 1) determines whether the amount of confidence determined in step 208 exceeds a threshold amount of confidence, which is received or determined by system 100 (see FIG. 1) prior to step 210. Hereinafter, in the discussion of FIG. 2, the threshold amount of confidence used in step 210 is referred to simply as "the threshold."

If chatbot 110 (see FIG. 1) determines in step 210 that the amount of confidence does not exceed the threshold, then the No branch is followed and step 212 is performed. In step 212, chatbot 110 (see FIG. 1) sends (i.e., broadcasts) the question to associated chatbots 116, 122, and 128 in FIG. 1 (or alternatively to the one or more peer chatbots that make up the other chatbot(s) in the gossip group). In response to step 212, the associated chatbots 116, 122, and 128 (see FIG. 1) receive the question and execute respective local NLCs 120, 126, and 132 (see FIG. 1) to determine intent classifications of the question and respective amounts of confidence that the intent classifications are accurate. Each of the associated chatbots 116, 122, and 128 (see FIG. 1) determines whether the corresponding amount of confidence in the intent classification of the question exceeds the threshold. If the amount of confidence exceeds the threshold, the associated chatbot sends a reply that includes the intent classification and the amount of confidence that the intent classification is accurate.

In step 214, chatbot 110 (see FIG. 1) receives the one or more replies sent in response to step 212, where each reply includes an intent classification of the question and a corresponding amount of confidence that the intent classification of the question is accurate.

In step 216, chatbot 110 (see FIG. 1) stores in LMC 112 (see FIG. 1) the intent classification(s) received in step 214 and the corresponding amount(s) of confidence that the intent classification(s) are accurate. Each amount of confidence stored in step 216 exceeds the threshold.

In step 218, based on an intent classification exceeding the threshold, chatbot 110 (see FIG. 1) selects the intent classification received in step 214 that has the greatest associated amount of confidence, and then generates a response to the question based on the selected intent classification. After step 218, chatbot 110 (see FIG. 1) presents the response to the user. The process of FIG. 2 ends at step 220.

Returning to step 210, if chatbot 110 (see FIG. 1) determines that the amount of confidence exceeds the threshold, then the Yes branch is followed and chatbot 110 (see FIG. 1) in step 216 updates its LMC 112 (FIG. 1) with the intent classification and amount of confidence determined in step 208. After the Yes branch of step 210 and step 216, step 218 includes chatbot 110 (see FIG. 1) generating a response based on the intent classification determined in step 208. After step 218, the process of FIG. 2 ends at step 220.

Returning to step 206, if chatbot 110 (see FIG. 1) determines that LMC 112 (see FIG. 1) includes an entry that has a sentence vector that matches (i.e., is similar to) the sentence vector calculated in step 204, then the Yes branch of step 206 is followed and step 222 is performed. In one embodiment, chatbot 110 (see FIG. 1) determines that an entry of LMC 112 (see FIG. 1) has a sentence vector that matches the sentence vector calculated in step 204 by determining that a distance between the two-dimensional sentence vector of the question received in step 202 and an average of the two-dimensional sentence vectors of one of the chatbots in the gossip group is less than the predetermined threshold distance and is the least distance of the aforementioned calculated distances. Chatbot 110 (see FIG. 1) identifies the entry in LMC 112 (see FIG. 1) that has a question whose sentence vector matches the sentence vector of the question received in step 202, the Yes branch of step 206 is followed, and step 222 is performed.

In step 222, chatbot 110 (see FIG. 1) determines whether chatbot 110 (see FIG. 1) is itself the owner of a local NLC intent classification result for the question (i.e., determines whether the entry in LMC 112 (see FIG. 1) that includes the sentence vector that matches the sentence vector calculated in step 204 indicates that chatbot 110 (see FIG. 1) is the owner of the local NLC intent classification). If chatbot 110 (see FIG. 1) determines in step 222 that chatbot 110 (see FIG. 1) is the owner of the aforementioned local NLC intent classification for the question, then the Yes branch of step 222 is followed and step 224 is performed.

In step 224, chatbot 110 (see FIG. 1) retrieves the intent classification of the question from the entry in LMC 112 (see FIG. 1) that includes the matching sentence vector. Since step 224 uses LMC 112 (see FIG. 1) and is performed directly after step 222 without a need to perform local NLC 114 (see FIG. 1), LMC 112 (see FIG. 1) advantageously provides storage for local classification knowledge which reduces natural language classification steps.

After the Yes branch of step 222 and step 224, chatbot 110 (see FIG. 1) in step 218 generates a response based on the intent classification retrieved in step 224. Following the Yes branch of step 222, step 224, and step 218, the process of FIG. 2 ends at step 220.

Returning to step 222, if chatbot 110 (see FIG. 1) determines that one of the other chatbots in the gossip group (i.e., chatbot 116, 122, or 128 in FIG. 1) is the owner of the aforementioned NLC intent classification result for the question, then the No branch of step 222 is followed and step 212 is performed. In step 212 which follows the No branch of step 222, chatbot 110 (see FIG. 1) sends the question directly to the other chatbot determined in step 222 because the other chatbot is recognized as being a SME for the knowledge domain of the question. Hereinafter in the discussion of the steps of FIG. 2 that follow the No branch of step 222, the other chatbot determined in step 222 is simply referred to as "the other chatbot." Chatbot 110 (see FIG. 1) determines that the other chatbot is the aforementioned SME because LMC 112 includes an entry that indicates that the other chatbot is the owner of an intent classification of another question whose sentence vector matches the sentence vector of the question received in step 202. By redirecting the question to the other chatbot which is recognized as the SME for the question, chatbot 110 (see FIG. 1) is using LMC 112 (see FIG. 1) as a temporary routing table that routes the question to a SME chatbot included in the gossip group.

After step 212 (which follows the No branch of step 222) and prior to step 214, the other chatbot (e.g., chatbot 122 (see FIG. 1)) retrieves an intent classification from its local memory cache (e.g., LMC 124 (see FIG. 1), which is the local memory cache of chatbot 122 (see FIG. 1)), where the retrieved intent classification is associated with the question in the local memory cache of the other chatbot. The intent classification included in the local memory cache of the other chatbot is needed instead of the intent classification associated with the question in LMC 112 (see FIG. 1), because the other chatbot may have updated its local knowledge base in its local memory cache, and therefore the intent classification included in the local memory cache of the other chatbot may be different from and more up-to-date than the intent classification in LMC 112 (see FIG. 1). The presence of the intent classification associated with the question and the other chatbot in LMC 112 (see FIG. 1) does, however, indicate that the other chatbot is a SME in the knowledge domain of the question.

In step 214 which follows the No branch of step 222 and step 212, chatbot 110 (see FIG. 1) receives a reply from the other chatbot which includes the intent classification that was retrieved by the other chatbot from its local memory cache.

In step 216, which follows the No branch of step 222, step 212, and step 214, chatbot 110 (see FIG. 1) stores in LMC 112 (see FIG. 1) the intent classification received in step 214.

In step 218, which follows the No branch of step 222, step 212, step 214, and step 216, based on the intent classification received in step 214, chatbot 110 (see FIG. 1) generates a response to the question. After step 218, the process of FIG. 2 ends at step 220.

As the process of FIG. 2 is repeated over time to perform natural language classifications of multiple questions, chatbots 110, 116, 122, and 128 (see FIG. 1) in the gossip group become SMEs in respective knowledge domains.

Figure 3:
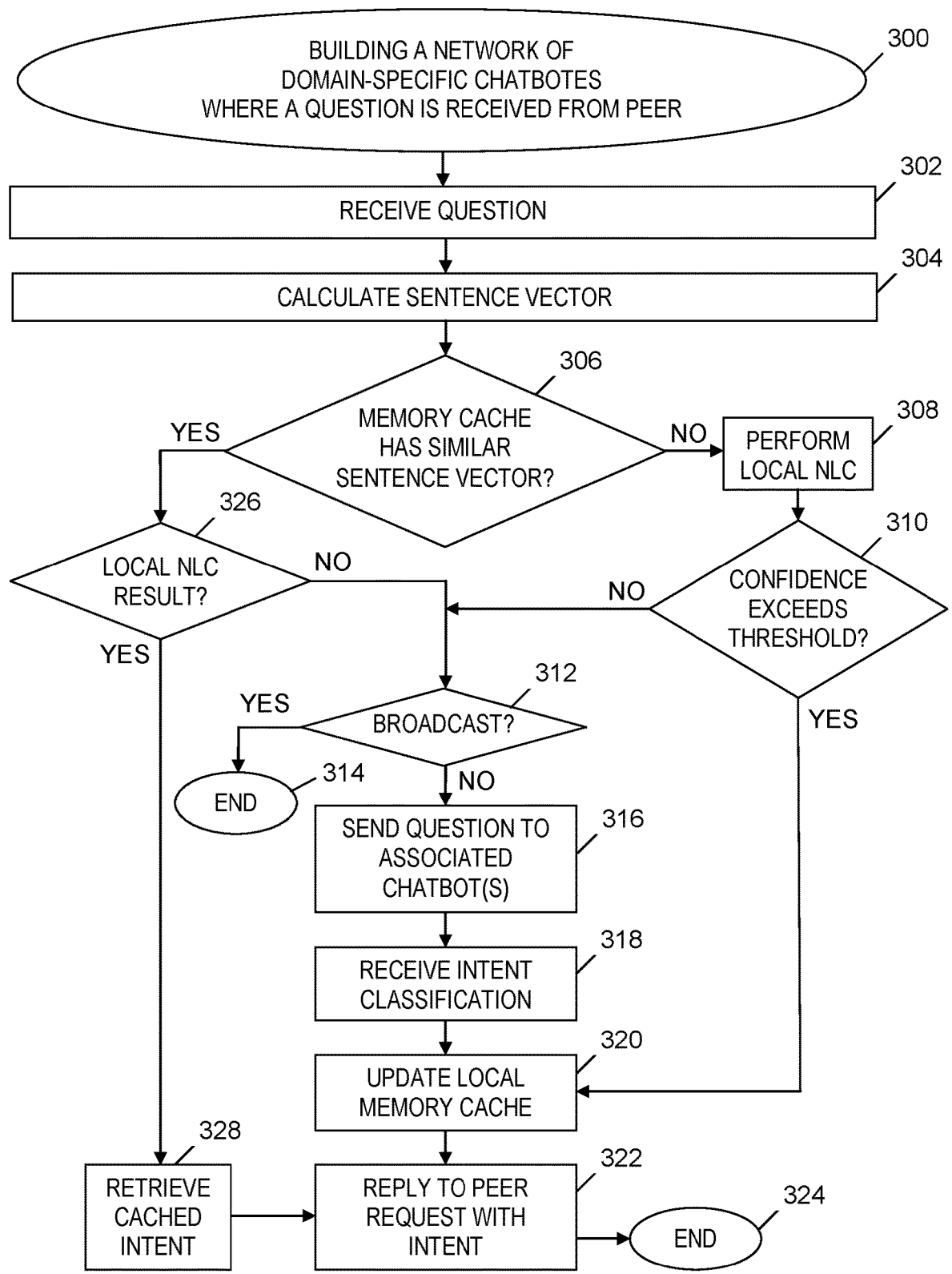
FIG. 3 is a flowchart of a process of building a network of domain-specific chatbots by receiving a question from a peer chatbot, where the process is implemented in the system of FIG. 1, in accordance with embodiments of the present invention.

FIG. 3 is a flowchart of a process of building a network of domain-specific chatbots by receiving a question from a peer chatbot, where the process is implemented in the system of FIG. 1, in accordance with embodiments of the present invention. The process of FIG. 3 begins at step 300. In step 302, chatbot 110 (see FIG. 1) receives a question provided by a peer chatbot (i.e., one of the other chatbots included in the gossip group). Hereinafter, in the discussion of FIG. 3, the question received in step 302 is referred to simply as "the question."

In step 304, chatbot 110 (see FIG. 1) calculates a sentence vector for the question.

In step 306, chatbot 110 (see FIG. 1) determines whether local memory cache 112 (see FIG. 1) includes an entry that has a sentence vector that matches (i.e., is similar to) the sentence vector calculated in step 304.

In one embodiment, chatbot 110 (see FIG. 1) uses word embedding to change the string that comprises the question to a word vector and then to a sentence vector which is a high dimension vector (e.g., a vector having four or five dimensions). Chatbot 110 (see FIG. 1) transforms the high-dimensioned sentence vector to a two-dimensional vector using a dimension reduction technique. In one embodiment, the dimension reduction technique is the t-Distributed Stochastic Neighbor Embedding (t-SNE) dimensionality reduction technique. Chatbot 110 (see FIG. 1) employs the aforementioned word embedding and dimension reduction techniques to generate two-dimensional vectors representing the questions stored in LMC 112 (see FIG. 1).

For each chatbot in the gossip group, chatbot 110 (see FIG. 1) determines a corresponding average of the two-dimensional sentence vectors associated with that chatbot. Chatbot 110 (see FIG. 1) calculates distances between the two-dimensional sentence vector representing the question and each of the averages determined for the chatbots in the gossip group. If chatbot 110 (see FIG. 1) determines that none of the aforementioned distances are less than a predetermined threshold distance, then chatbot 110 (see FIG. 1) determines that no entry in LMC 112 (see FIG. 1) has a question whose sentence vector matches (i.e., is similar to) the sentence vector calculated in step 304, the No branch of step 306 is followed, and step 308 is performed.

In step 308, chatbot 110 (see FIG. 1) performs a local natural language classification by executing NLC 114 (see FIG. 1). Step 308 includes chatbot 110 (see FIG. 1) employing a NLC model associated with chatbot 110 (see FIG. 1) to perform a natural language classification of the question received in step 302, which determines an intent classification of the question and determines an amount (i.e., a measure) of confidence that the intent classification is accurate.

In step 310, chatbot 110 (see FIG. 1) determines whether the amount of confidence determined in step 308 exceeds a threshold amount of confidence, which is received or determined by system 100 (see FIG. 1) prior to step 310. Hereinafter, in the discussion of FIG. 3, the threshold amount of confidence used in step 310 is referred to simply as "the threshold."

If chatbot 110 (see FIG. 1) determines in step 310 that the amount of confidence does not exceed the threshold, then the No branch is followed and step 312 is performed. In step 312, chatbot 110 (see FIG. 1) determines whether the question was received in a broadcast to multiple chatbots included in step 212 (see FIG. 2) following the No branch of step 210 (see FIG. 2). If chatbot 110 (see FIG. 1) determines in step 312 that the question was received in the broadcast to multiple chatbots, then the Yes branch of step 312 is followed and the process of FIG. 3 ends at step 314.

If chatbot 110 (see FIG. 1) determines in step 312 that the question was not received in a broadcast, then the No branch of step 312 is followed and step 316 is performed. In step 316, chatbot 110 (see FIG. 1) sends (i.e., broadcasts) the question to associated chatbots 116, 122, and 128 in FIG. 1 (or alternatively to the one or more peer chatbots that make up the other chatbot(s) in the gossip group that includes chatbot 110 (see FIG. 1)). In response to step 316, the associated chatbots 116, 122, and 128 (see FIG. 1) receive the question and execute respective local NLCs 120, 126, and 132 (see FIG. 1) to determine intent classifications of the question and respective amounts of confidence that the intent classifications are accurate. Each of the associated chatbots 116, 122, and 128 (see FIG. 1) determines whether the corresponding amount of confidence in the intent classification of the question exceeds the threshold. If the amount of confidence exceeds the threshold, the associated chatbot sends a reply that includes the intent classification and the amount of confidence that the intent classification is accurate.

In step 318, chatbot 110 (see FIG. 1) receives the one or more replies sent in response to step 316, where each reply includes an intent classification of the question and a corresponding amount of confidence that the intent classification of the question is accurate.

In step 320, chatbot 110 (see FIG. 1) stores in LMC 112 (see FIG. 1) the intent classification(s) received in step 318 and the corresponding amount(s) of confidence that the intent classification(s) are accurate. Each amount of confidence stored in step 320 exceeds the threshold.

In step 322, based on an intent classification exceeding the threshold, chatbot 110 (see FIG. 1) selects the intent classification received in step 318 that has the greatest associated amount of confidence, and then generates and sends a reply to the peer chatbot that sent the question to chatbot 110 (see FIG. 1). The reply generated in step 322 includes the selected intent classification. The process of FIG. 3 ends at step 324.

Returning to step 310, if chatbot 110 (see FIG. 1) determines that the amount of confidence exceeds the threshold, then the Yes branch is followed and in step 320, chatbot 110 (see FIG. 1) updates its LMC 112 (see FIG. 1) with the intent classification and amount of confidence determined in step 308. After the Yes branch of step 310 and step 320, step 322 includes chatbot 110 (see FIG. 1) generating and sending a reply to the peer chatbot that sent the question to chatbot 110 (see FIG. 1), where the reply includes the intent classification determined in step 308. Following the Yes branch of step 310, step 320, and step 322, the process of FIG. 3 ends at step 324.

Returning to step 306, if chatbot 110 (see FIG. 1) determines that LMC 112 (see FIG. 1) includes an entry that has a sentence vector that matches (i.e., is similar to) the sentence vector calculated in step 304, then the Yes branch of step 306 is followed and step 326 is performed. In one embodiment, chatbot 110 (see FIG. 1) determines that an entry of LMC 112 (see FIG. 1) has a sentence vector that matches the sentence vector calculated in step 304 by determining that a distance between the two-dimensional sentence vector of the question received in step 302 and an average of the two-dimensional sentence vectors of one of the chatbots in the gossip group is less than the predetermined threshold distance and is the least distance of the aforementioned calculated distances. Chatbot 110 (see FIG. 1) identifies the entry in LMC 112 (see FIG. 1) that has a question whose sentence vector matches the sentence vector calculated in step 304, the Yes branch of step 306 is followed, and step 326 is performed.

In step 326, chatbot 110 (see FIG. 1) determines whether chatbot 110 (see FIG. 1) is itself the owner of a local NLC intent classification result for the question (i.e., determines whether the entry in LMC 112 (see FIG. 1) that includes the sentence vector that matches the sentence vector calculated in step 304 indicates that chatbot 110 (see FIG. 1) is the owner of the local NLC intent classification). If chatbot 110 (see FIG. 1) determines in step 326 that chatbot 110 (see FIG. 1) is the owner of the aforementioned local NLC intent classification for the question, then the Yes branch of step 326 is followed and step 328 is performed.

In step 328, chatbot 110 (see FIG. 1) retrieves the intent classification of the question from the entry in LMC 112 (see FIG. 1) that includes the matching sentence vector.

After the Yes branch of step 326 and step 328, step 322 includes chatbot 110 (see FIG. 1) generating and sending a reply to the peer chatbot that sent the question to chatbot 110 (see FIG. 1), where the reply includes the intent classification determined in step 326. Following the Yes branch of step 326, step 328, and step 322, the process of FIG. 3 ends at step 324.

Returning to step 326, if chatbot 110 (see FIG. 1) determines that one of the other chatbots in the gossip group (i.e., chatbot 116, 122, or 128 in FIG. 1) is the owner of the NLC intent classification result for the question, then the No branch of step 326 is followed and step 312 is performed.

In step 312 which follows the No branch of step 326, chatbot 110 (see FIG. 1) determines whether the question was received as a result of a broadcast to multiple chatbots in the gossip group (e.g., received in the broadcast included in step 212 in FIG. 2 which followed the No branch of step 210 in FIG. 2). If chatbot 110 (see FIG. 1) determines in step 312 that the question was received in the broadcast to the multiple chatbots, then the Yes branch of step 312 is followed and the process of FIG. 3 ends at step 314.

If chatbot 110 (see FIG. 1) determines in step 312 that the question was not received as a result of a broadcast to multiple chatbots, then the No branch of step 312 is followed and step 316 is performed by chatbot 110 (see FIG. 1) sending the question to the other chatbot determined in step 326 because the other chatbot is recognized as being a SME for the knowledge domain of the question. Hereinafter in the discussion of the steps of FIG. 3 that follow the No branch of step 326, the other chatbot determined in step 326 is simply referred to as "the other chatbot."

After step 316, which follows the No branch of step 326 and the No branch of step 312, and prior to step 318, the other chatbot (e.g., chatbot 122 (see FIG. 1)) retrieves an intent classification from its local memory cache (e.g., LMC 124 (see FIG. 1), which is the local memory cache of chatbot 122 (see FIG. 1)), where the retrieved intent classification is associated with the question in the local memory cache of the other chatbot. Again, the intent classification included in the local memory cache of the other chatbot is needed instead of the intent classification associated with the question in LMC 112 (see FIG. 1), because the other chatbot may have updated its local knowledge base in its local memory cache, and therefore the intent classification included in the local memory cache of the other chatbot may be different from and more up-to-date than the intent classification in LMC 112 (see FIG. 1). Again, the presence of the intent classification associated with the question and the other chatbot in LMC 112 (see FIG. 1) indicates that the other chatbot is a SME in the knowledge domain of the question.

In step 318 which follows the No branch of step 326, the No branch of step 312, and step 316, chatbot 110 (see FIG. 1) receives a reply from the other chatbot which includes the intent classification that was retrieved by the other chatbot from its local memory cache.

In step 320, which follows the No branch of step 326, the No branch of step 312, step 316, and step 318, chatbot 110 (see FIG. 1) stores in LMC 112 (see FIG. 1) the intent classification received in step 318.

In step 322, which follows the No branch of step 326, the No branch of step 312, step 316, step 318, and step 320, based on the intent classification received in step 318, chatbot 110 (see FIG. 1) generates and sends a reply to the peer chatbot that sent the question. The reply includes the intent classification received in step 318. After step 322, the process of FIG. 3 ends at step 324.

As the process of FIG. 3 is repeated over time to perform natural language classifications of multiple questions, chatbots 110, 116, 122, and 128 (see FIG. 1) in the gossip group become SMEs in respective knowledge domains.

EXAMPLES

Figures 4, 5:
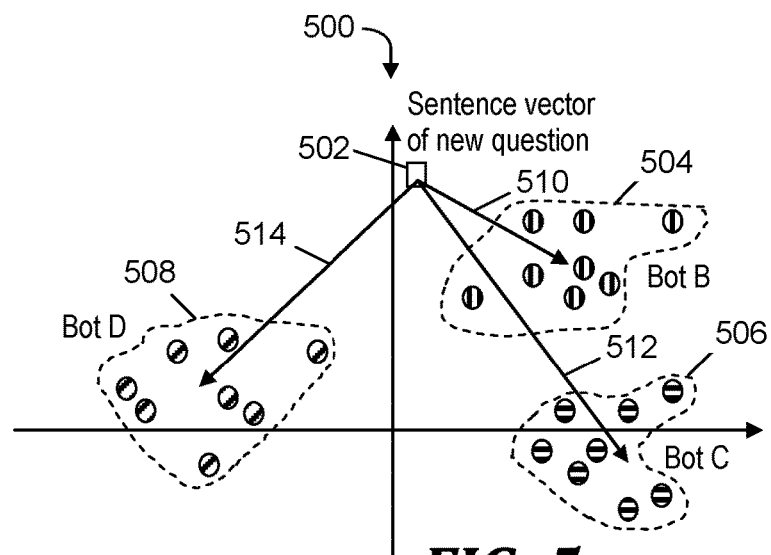
FIG. 4 is an example of a local memory cache used in the system of FIG. 1 and used in the processes of FIG. 2 and FIG. 3, in accordance with embodiments of the present invention.
FIG. 5 is an example of a calculating the distance of a new question sentence vector within the process of FIG. 2, in accordance with embodiments of the present invention.

FIG. 4 is an example of a local memory cache 400 used in the system of FIG. 1 and the processes of FIG. 2 and FIG. 3, in accordance with embodiments of the present invention. Local memory cache 400 is an example of LMC 112, 118, 124, or 130 in FIG. 1. Local memory cache 400 includes questions in question 402, sentence vectors in sentence vector 404, owners in owner 406, amounts of confidence in confidence 408, and intent classifications in intent 410. Each question in question 402 is provided by a user via an app. Each sentence vector in sentence vector 404 is the result of applying word embedding to the corresponding question 402. Each owner in owner 406 is an identification of the chatbot that previously provided a corresponding intent classification in intent 410 for the corresponding question in question 402, where the provided intent classification had a corresponding amount of confidence in confidence 408 that was greater than or equal to a predetermined threshold of 0.6.

FIG. 5 is an example 500 of a calculating the distance of a new question sentence vector within the process of FIG. 2, in accordance with embodiments of the present invention. The distance calculation shown in example 500 is an example of determining a particular chatbot to redirect a question to in step 212 (see FIG. 2) after the No branch of step 222 (see FIG. 2) (or in step 316 which follows the No branch of step 326 and the No branch of step 312 in FIG. 3).

In example 500, chatbot 110 (see FIG. 1) receives a new question, which is a question for which LMC 112 (see FIG. 1) includes no intent classification that resulted from NLC 114 (see FIG. 1) (i.e., there is no entry in the local memory cache of chatbot 110 (see FIG. 1) that indicates "SELF" as the owner of the intent classification in that entry). Chatbot 110 (see FIG. 1) determines a sentence vector of the new question 502, a first group 504 of sentence vectors whose owner is Bot B (i.e., chatbot 116 (see FIG. 1)) as indicated in LMC 112 (see FIG. 1); a second group 506 of sentence vectors whose owner is Bot C (i.e., chatbot 122 (see FIG. 1)); and a third group 508 of sentence vectors whose owner is Bot D (i.e., chatbot 128 (see FIG. 1).

Chatbot 110 (see FIG. 1) determines a first distance 510 between sentence vector 502 and an average of the sentence vectors in first group 504; a second distance 512 between sentence vector 502 and an average of the sentence vectors in second group 506; and a third distance 514 between sentence vector 502 and an average of the sentence vectors in third group 508. To find distances 510, 512, and 514, chatbot 110 (see FIG. 1) employs dimension reduction of sentence vector 502 and the sentence vectors in groups 504, 506, and 508 so that all of the sentence vectors are plotted in only two dimensions. Chatbot 110 (see FIG. 1) determines that second distance 510 is the least distance among the distances 510, 512, and 514 and that Bot B is associated with distance 510; therefore, chatbot 110 (see FIG. 1) identifies Bot B as the particular chatbot in the gossip group that chatbot 110 (see FIG. 1) sends the question to (i) in step 212 following the No branch of step 222 in FIG. 2 or (ii) in step 316 following the No branch of step 326 and the No branch of step 312 in FIG. 3.

Figure 6:
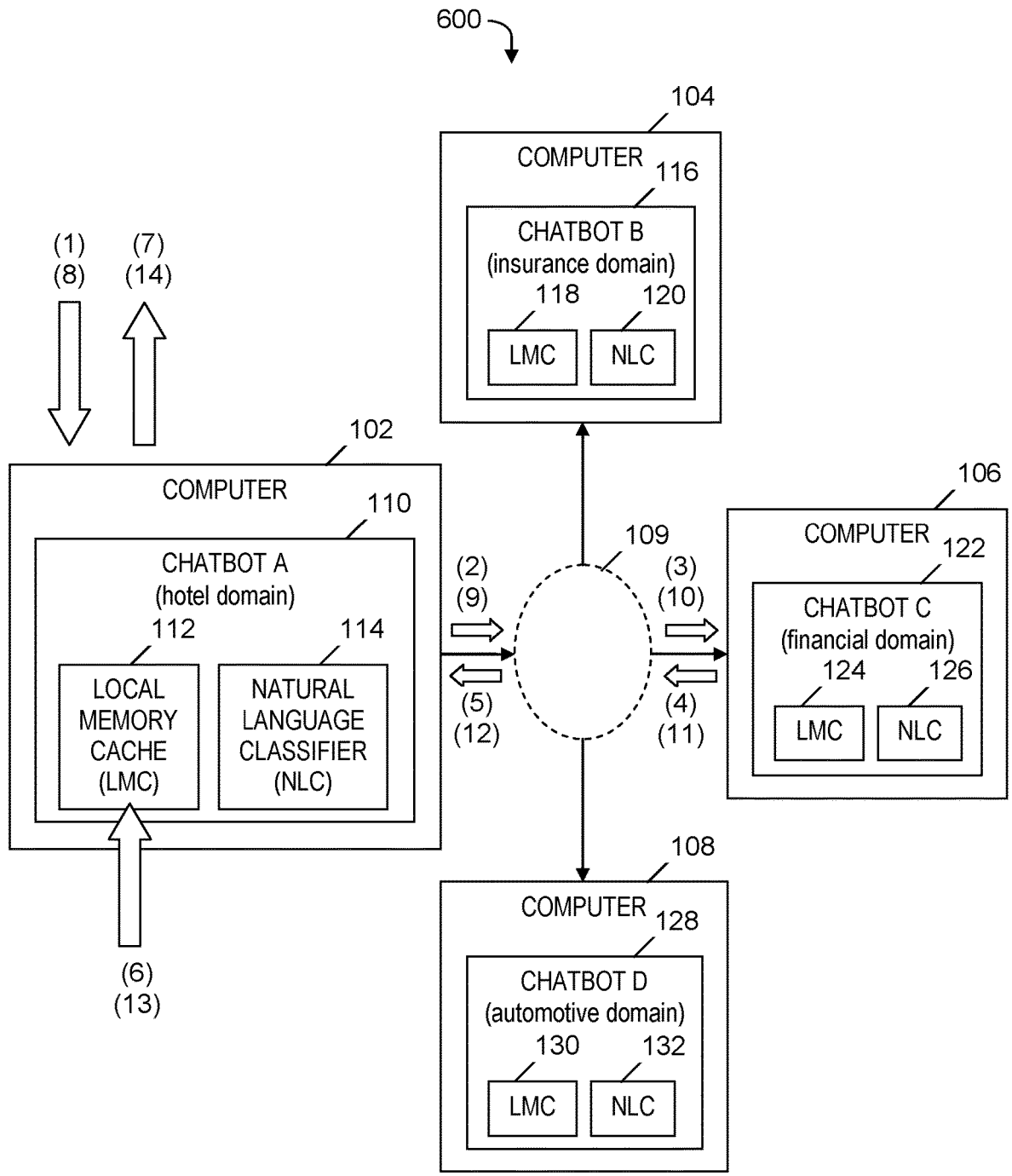
FIG. 6 is an example of processing a question in the system of FIG. 1 using the process of FIG. 2, in accordance with embodiments of the present invention.

FIG. 6 is an example 600 of processing a question in system 100 of FIG. 1 using the process of FIG. 2, in accordance with embodiments of the present invention. In example 600, chatbot 110 is a SME in a hotel-related knowledge domain; chatbot 116 is a SME in an insurance-related knowledge domain; chatbot 122 is a SME in a financial-related knowledge domain; and chatbot 128 is a SME in an automotive-related knowledge domain. Steps (1) through (7) are an example of chatbot 110 not being able to handle a received question and then broadcasting the question to the other chatbots.

In step (1) in example 600, chatbot 110 receives a question from a user via an app, calculates a sentence vector of the question, uses dimension reduction to express the sentence vector and other sentence vectors in LMC 112 in two dimensions, determines that LMC 112 does not include a sentence vector similar to the sentence vector of the received question, performs a local natural language classification by executing NLC 114, determines an intent classification of the question and a confidence that the intent classification is accurate. Step (1) also includes chatbot 110 determining that the confidence is less than a predetermined threshold amount of confidence. Step (1) is an example of steps 202, 204, 206, 208, and 210 in FIG. 2.

In response to determining the confidence is less than the threshold amount of confidence, chatbot 110 performs step (2) which broadcasts the question to chatbot 116, chatbot 122, and chatbot 128 via gossip messaging bus 109. Step (2) is an example of step 212 in FIG. 2.

In step (3), chatbot 122 receives the broadcasted question and subsequently performs a local natural language classification by executing NLC 126, which determines an intent classification of the question and a confidence that the intent classification is accurate. Chatbot 122 determines that the confidence exceeds the threshold amount of confidence, and in response, in step (4) sends via gossip messaging bus 109 a reply to chatbot 110, where the reply includes the intent classification and the confidence.

In step (5) chatbot 110 receives the reply from chatbot 122 via gossip messaging bus 109. Step (5) is an example of step 214 in FIG. 2.

In step (6), chatbot 110 updates LMC 112 by adding an entry that includes the question, the sentence vector of the question, the owner of the reply (i.e., chatbot 122), the intent classification included in the reply, and the confidence included in the reply. Step (6) is an example of step 216 in FIG. 2.

In step (7), chatbot 110 generates a response based on the intent classification included in the reply and presents the response to the user.

Steps (8) through (14) illustrate an example of chatbot 110 receiving a new question and then redirecting the question to a chatbot that is a SME in the knowledge domain of the question. In step (8) in example 600, chatbot 110 receives a question from a user via an app, calculates a sentence vector of the question, uses dimension reduction to express the sentence vector in two dimensions, compares the distances between the dimensionally-reduced sentence vector to previously determined sentence vectors for which the same dimension reduction was performed and for which intent classifications were previously determined and received from chatbots 110, 116, 122, and 128. Chatbot 110 determines the least of the distances is the distance to the sentence vectors for which intent classifications were determined by chatbot 122, which indicates that chatbot 122 is the SME for the knowledge domain of the new question. Step (1) is an example of steps 202, 204, 206, the Yes branch of step 206, and 222 in FIG. 2.

In response to determining that least of the distances is associated with chatbot 122 and chatbot 122 is the SME for the knowledge domain of the new question, chatbot 110 performs step (9) which sends the new question to chatbot 122 via gossip messaging bus 109. Step (9) is an example of step 212 in FIG. 2.

In step (10), chatbot 122 receives the new question via gossip messaging bus 109 and subsequently locates the new question in LMC 124 and retrieves the intent classification and confidence stored in LMC 124 which is associated with the new question. In step (11), chatbot 122 sends via gossip messaging bus 109 a reply to chatbot 110, where the reply includes the intent classification and confidence retrieved from LMC 124.

In step (12) chatbot 110 receives the reply from chatbot 122 via gossip messaging bus 109. Step (12) is an example of step 214 in FIG. 2.

In step (13), chatbot 110 updates LMC 112 by adding an entry that includes the new question, the sentence vector of the new question, the owner of the reply (i.e., an identification of chatbot 122), the intent classification included in the reply, and the confidence included in the reply. Step (13) is an example of step 216 in FIG. 2.

In step (14), chatbot 110 generates a response based on the intent classification included in the reply and presents the response to the user. Step (14) is an example of a step that includes step 218 in FIG. 2.

Computer System

Figure 7:
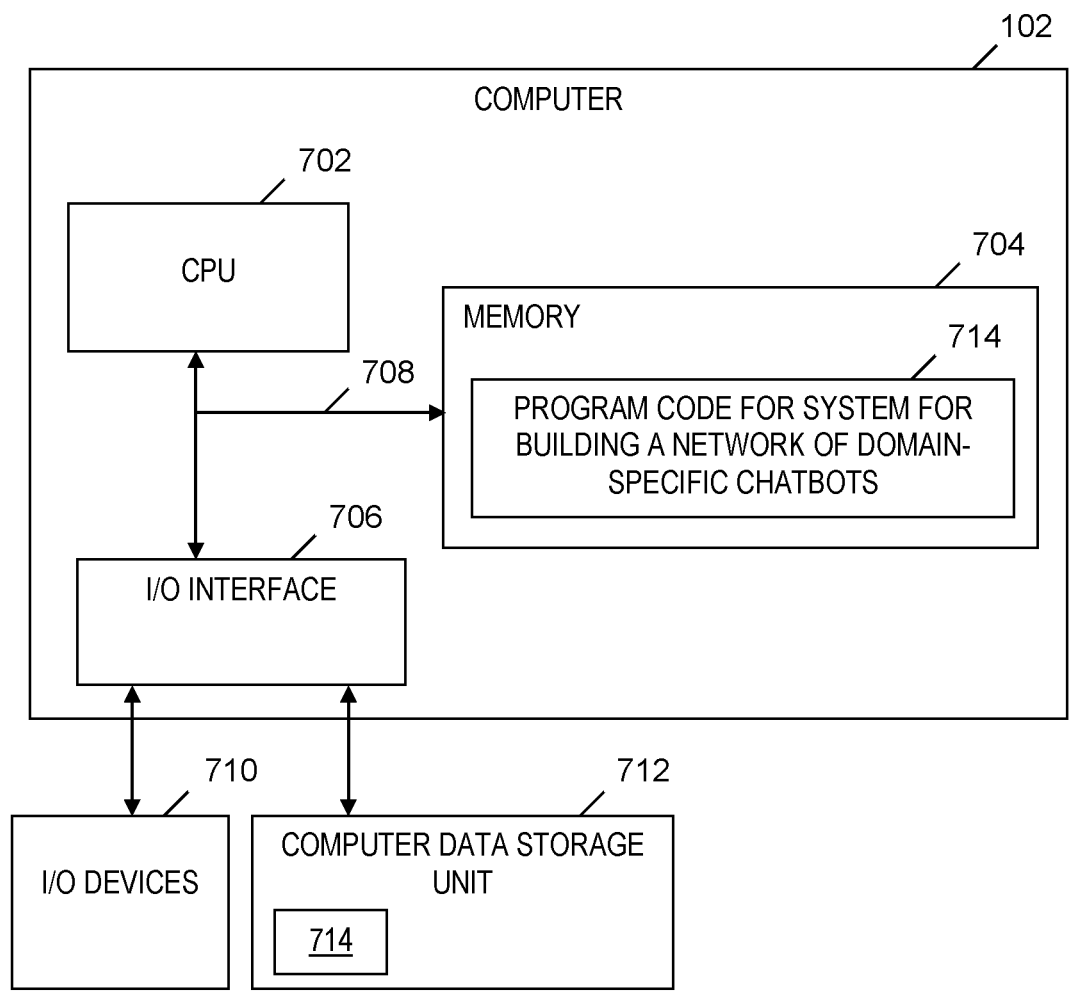
FIG. 7 is a block diagram of a computer included in the system of FIG. 1 and that implements the process of FIG. 2 and FIG. 3, in accordance with embodiments of the present invention.

FIG. 7 is a block diagram of a computer included in the system of FIG. 1 and that implements the process of FIG. 2 and FIG. 3, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for a system that includes chatbot 110 (see FIG. 1) to perform a method of building a network of domain-specific chatbots, where the instructions are executed by CPU 702 via memory 704. Similar systems to perform a method of building a network of domain-specific chatbots include chatbots 116, 122, and 128 (see FIG. 1), respectively. CPU 702 may include a single processing unit, or be distributed across one or more processing units in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes a known computer-readable storage medium, which is described below. In one embodiment, computer data storage unit 712 is a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are executed by CPU 702 via memory 704 to build a network of domain-specific chatbots. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to building a network of domain-specific chatbots. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to build a network of domain-specific chatbots. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of building a network of domain-specific chatbots.

While it is understood that program code 714 for building a network of domain-specific chatbots may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider can offer to create, maintain, support, etc. a process of building a network of domain-specific chatbots. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of building a network of domain-specific chatbots that employ distributed natural language classifiers, the method comprising:

a computer receiving a question as natural language input to a first chatbot included in a group of chatbots, the natural language input being from an application utilized by a user;

the computer calculating an initial sentence vector specified by the question as a vector of real numbers that are mapped to words and phrases in the question, wherein the calculating the initial sentence vector includes changing a string comprising the question to a word vector and subsequently to the initial sentence vector by using word embedding;

the computer transforming the initial sentence vector into a two-dimensional sentence vector by employing a dimension reduction technique and the word embedding;

the computer determining that the two-dimensional sentence vector does not match any of one or more sentence vectors stored in a memory cache of the first chatbot by determining corresponding averages of two-dimensional sentence vectors associated with other chatbots included in the group of chatbots, determining distances between the two-dimensional sentence vector and the averages determined for the other chatbots, and determining that none of the distances is less than a threshold distance;

based on the two-dimensional sentence vector not matching the one or more sentence vectors stored in the memory cache of the first chatbot, the computer generating a first intent of the question and a first amount of confidence that the first intent is an actual intent of the question by executing a first natural language classifier included in the first chatbot;

the computer determining that the first amount of confidence does not exceed a threshold amount of confidence;

based on the first amount of confidence not exceeding the threshold amount, the computer broadcasting the question to other chatbots included in the group of chatbots;

in response to the broadcasting, the computer receiving intents of the question and respective amounts of confidence that the intents are the actual intent from the other chatbots, the intents and the amounts of confidence including a second intent and a second amount of confidence received from a second chatbot included in the group of chatbots; and the computer determining that the second amount of confidence exceeds the threshold amount of confidence, and in response,
- storing an association among the question, the second chatbot, the second amount of confidence, and the second intent in a memory cache included in the first chatbot,
- generating a response to the question based on the second intent, and
- presenting the response to the user from the first chatbot.

2. The method of claim 1, further comprising:

the computer receiving a new question as natural language input from the application or another application to the first chatbot;

the computer calculating a second sentence vector specified by the new question;

the computer determining distances between the second sentence vector and averages of groups of sentence vectors in the memory cache, the groups of sentence vectors being associated with respective chatbots in the group of chatbots;

the computer determining a minimum distance among the distances;

the computer identifying a chatbot in the group of chatbots based on the identified chatbot being associated with the minimum distance;

the computer determining that the identified chatbot is a chatbot included in the group of chatbots that is other than the first chatbot; and based on the identified chatbot being other than the first chatbot, the computer sending the new question to the identified chatbot, subsequently receiving an intent of the new question from the identified chatbot, and in response,
- storing the received intent of the new question in the memory cache,
- generating a second response to the new question based on the received intent of the new question, and
- presenting the second response to the user or another user as a response from the first chatbot.

3. The method of claim 2, wherein the determining the distances between the second sentence vector and the averages of the groups of sentence vectors in the memory cache includes the computer reducing the dimensions of the second sentence vector and the sentence vectors in the memory cache by using the dimension reduction technique.

4. The method of claim 1, further comprising:

the computer calculating a first sentence vector specified by the question;

the computer storing the first sentence vector in the memory cache in the association among the question, the second chatbot, the second amount of confidence, and the second intent;

the computer receiving a second question as natural language input from the application or another application to the first chatbot;

the computer calculating a second sentence vector specified by the second question;

the computer determining that the second sentence vector does not match any sentence vector stored in the memory cache;

based on the second sentence vector not matching any sentence vector stored in the memory cache, the computer executing the first natural language classifier, which generates an intent of the second question and an amount of confidence that the intent of the second question is an actual intent of the second question;

the computer determining that the amount of confidence that the intent of the second question in the actual intent of the second question exceeds the threshold amount of confidence; and based on the first amount of confidence of the intent of the second question exceeding the threshold amount of confidence, the computer storing the intent of the second question in the memory cache in another association among the second question, the second sentence vector, the first chatbot, and the amount of confidence of the intent of the second question, generating a second response to the second question based on the intent of the second question, and presenting the second response to the user or another user as a response from the first chatbot.

5. The method of claim 1, further comprising:

the computer receiving a new question as natural language input from the application or another application to the first chatbot;

the computer calculating a second sentence vector specified by the new question;

the computer determining distances between the second sentence vector and averages of groups of sentence vectors in the memory cache, the groups of sentence vectors being associated with respective chatbots in the group of chatbots;

the computer determining a minimum distance among the distances;

the computer identifying a chatbot in the group of chatbots based on the identified chatbot being associated with the minimum distance;

the computer determining that the identified chatbot is the first chatbot;

based on the identified chatbot being the first chatbot, the computer retrieving an intent of the new question from the memory cache, the retrieved intent being associated with the second sentence vector in the memory cache; and based the retrieved intent of the new question, the computer generating a second response to the new question and presenting the second response to the user or another user as a response from the first chatbot.

6. The method of claim 1, further comprising:

the computer executing the first natural language classifier included in the first chatbot, which generates a second intent of a second question and a second amount of confidence that the second intent is an actual intent of the second question;

the computer determining that the second amount of confidence does not exceed the threshold amount of confidence;

based on the second amount of confidence not exceeding the threshold amount, the computer determining that the second question is received from another chatbot broadcasting the second question to every other chatbot included in the group of chatbots; and based on the second question being received from the other chatbot broadcasting the second question, the computer determining not to generate any response to the second question.

7. The method of claim 1, further comprising:
providing at least one support service for at least one of creating, integrating, hosting, maintaining, and deploying computer readable program code in the computer, the program code being executed by a processor of the computer to implement the receiving the question, calculating the initial sentence vector, transforming the initial sentence vector into the two-dimensional sentence vector, determining that the two-dimensional sentence vector does not match any of the one or more sentence vectors stored in the memory cache of the first chatbot, generating the first intent of the question, determining that the first amount of confidence does not exceed the threshold amount of confidence, broadcasting the question to the other chatbots, receiving the intents of the question and the respective amounts of confidence that the intents are the actual intent, determining that the second amount of confidence exceeds the threshold amount of confidence, storing the association among the question, the second chatbot, the second amount of confidence, and the second intent in the memory cache, generating the response to the question based on the second intent, and presenting the response to the user from the first chatbot.

8. A computer program product for building a network of domain-specific chatbots that employ distributed natural language classifiers, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising:
the computer system receiving a question as natural language input to a first chatbot included in a group of chatbots, the natural language input being from an application utilized by a user:
the computer system calculating an initial sentence vector specified by the question as a vector of real numbers that are mapped to words and phrases in the question, wherein the calculating the initial sentence vector includes changing a string comprising the question to a word vector and subsequently to the initial sentence vector by using word embedding;
the computer system transforming the initial sentence vector into a two-dimensional sentence vector by employing a dimension reduction technique and the word embedding;
the computer system determining that the two-dimensional sentence vector does not match any of one or more sentence vectors stored in a memory cache of the first chatbot by determining corresponding averages of two-dimensional sentence vectors associated with other chatbots included in the group of chatbots, determining distances between the two-dimensional sentence vector and the averages determined for the other chatbots, and determining that none of the distances is less than a threshold distance;
based on the two-dimensional sentence vector not matching the one or more sentence vectors stored in the memory cache of the first chatbot, the computer system generating a first intent of the question and a first amount of confidence that the first intent is an actual intent of the question by executing a first natural language classifier included in the first chatbot;
the computer system determining that the first amount of confidence does not exceed a threshold amount of confidence;
based on the first amount of confidence not exceeding the threshold amount, the computer system broadcasting the question to other chatbots included in the group of chatbots;
in response to the broadcasting, the computer system receiving intents of the question and respective amounts of confidence that the intents are the actual intent from the other chatbots, the intents and the amounts of confidence including a second intent and a second amount of confidence received from a second chatbot included in the group of chatbots; and
the computer system determining that the second amount of confidence exceeds the threshold amount of confidence, and in response,
storing an association among the question, the second chatbot, the second amount of confidence, and the second intent in a memory cache included in the first chatbot,
generating a response to the question based on the second intent, and
presenting the response to the user from the first chatbot.

9. The computer program product of claim 8, wherein the method further comprises:
the computer system receiving a new question as natural language input from the application or another application to the first chatbot;
the computer system calculating a second sentence vector specified by the new question;
the computer system determining distances between the second sentence vector and averages of groups of sentence vectors in the memory cache, the groups of sentence vectors being associated with respective chatbots in the group of chatbots;
the computer system determining a minimum distance among the distances;
the computer system identifying a chatbot in the group of chatbots based on the identified chatbot being associated with the minimum distance;
the computer system determining that the identified chatbot is a chatbot included in the group of chatbots that is other than the first chatbot; and
based on the identified chatbot being other than the first chatbot, the computer system sending the new question to the identified chatbot, subsequently receiving an intent of the new question from the identified chatbot, and in response,
storing the received intent of the new question in the memory cache,
generating a second response to the new question based on the received intent of the new question, and
presenting the second response to the user or another user as a response from the first chatbot.

10. The computer program product of claim 9, wherein the determining the distances between the second sentence vector and the averages of the groups of sentence vectors in the memory cache includes the computer system reducing the dimensions of the second sentence vector and the sentence vectors in the memory cache by using the dimension reduction technique.

11. The computer program product of claim 8, wherein the method further comprises:
the computer system calculating a first sentence vector specified by the question;
the computer system storing the first sentence vector in the memory cache in the association among the question, the second chatbot, the second amount of confidence, and the second intent;
the computer system receiving a second question as natural language input from the application or another application to the first chatbot;
the computer system calculating a second sentence vector specified by the second question;
the computer system determining that the second sentence vector does not match any sentence vector stored in the memory cache;
based on the second sentence vector not matching any sentence vector stored in the memory cache, the computer system executing the first natural language classifier, which generates an intent of the second question and an amount of confidence that the intent of the second question is an actual intent of the second question;
the computer system determining that the amount of confidence that the intent of the second question in the actual intent of the second question exceeds the threshold amount of confidence; and
based on the first amount of confidence of the intent of the second question exceeding the threshold amount of confidence, the computer system storing the intent of the second question in the memory cache in another association among the second question, the second sentence vector, the first chatbot, and the amount of confidence of the intent of the second question, generating a second response to the second question based on the intent of the second question, and presenting the second response to the user or another user as a response from the first chatbot.

12. The computer program product of claim 8, wherein the method further comprises:
the computer system receiving a new question as natural language input from the application or another application to the first chatbot;
the computer system calculating a second sentence vector specified by the new question;
the computer system determining distances between the second sentence vector and averages of groups of sentence vectors in the memory cache, the groups of sentence vectors being associated with respective chatbots in the group of chatbots;
the computer system determining a minimum distance among the distances;
the computer system identifying a chatbot in the group of chatbots based on the identified chatbot being associated with the minimum distance;
the computer system determining that the identified chatbot is the first chatbot;
based on the identified chatbot being the first chatbot, the computer system retrieving an intent of the new question from the memory cache, the retrieved intent being associated with the second sentence vector in the memory cache; and
based on the retrieved intent of the new question, the computer system generating a second response to the new question and presenting the second response to the user or another user as a response from the first chatbot.

13. A computer system comprising:
a central processing unit (CPU);
a memory coupled to the CPU; and
a computer readable storage device coupled to the CPU, the computer readable storage device containing instructions that are executed by the CPU via the memory to implement a method of building a network of domain-specific chatbots that employ distributed natural language classifiers, the method comprising:
the computer system receiving a question as natural language input to a first chatbot included in a group of chatbots, the natural language input being from an application utilized by a user;
the computer system calculating an initial sentence vector specified by the question as a vector of real numbers that are mapped to words and phrases in the question, wherein the calculating the initial sentence vector includes changing a string comprising the question to a word vector and subsequently to the initial sentence vector by using word embedding;
the computer system transforming the initial sentence vector into a two-dimensional sentence vector by employing a dimension reduction technique and the word embedding;
the computer system determining that the two-dimensional sentence vector does not match any of one or more sentence vectors stored in a memory cache of the first chatbot by determining corresponding averages of two-dimensional sentence vectors associated with other chatbots included in the group of chatbots, determining distances between the two-dimensional sentence vector and the averages determined for the other chatbots, and determining that none of the distances is less than a threshold distance;
based on the two-dimensional sentence vector not matching the one or more sentence vectors stored in the memory cache of the first chatbot, the computer system generating a first intent of the question and a first amount of confidence that the first intent is an actual intent of the question by executing a first natural language classifier included in the first chatbot;
the computer system determining that the first amount of confidence does not exceed a threshold amount of confidence;
based on the first amount of confidence not exceeding the threshold amount, the computer system broadcasting the question to other chatbots included in the group of chatbots;
in response to the broadcasting, the computer system receiving intents of the question and respective amounts of confidence that the intents are the actual intent from the other chatbots, the intents and the amounts of confidence including a second intent and a second amount of confidence received from a second chatbot included in the group of chatbots; and
the computer system determining that the second amount of confidence exceeds the threshold amount of confidence, and in response,
storing an association among the question, the second chatbot, the second amount of confidence, and the second intent in a memory cache included in the first chatbot,
generating a response to the question based on the second intent, and
presenting the response to the user from the first chatbot.

14. The computer system of claim 13, wherein the method further comprises:
- the computer system receiving a new question as natural language input from the application or another application to the first chatbot;
- the computer system calculating a second sentence vector specified by the new question;
- the computer system determining distances between the second sentence vector and averages of groups of sentence vectors in the memory cache, the groups of sentence vectors being associated with respective chatbots in the group of chatbots;
- the computer system determining a minimum distance among the distances;
- the computer system identifying a chatbot in the group of chatbots based on the identified chatbot being associated with the minimum distance;
- the computer system determining that the identified chatbot is a chatbot included in the group of chatbots that is other than the first chatbot; and
- based on the identified chatbot being other than the first chatbot, the computer system sending the new question to the identified chatbot, subsequently receiving an intent of the new question from the identified chatbot, and in response,
  - storing the received intent of the new question in the memory cache,
  - generating a second response to the new question based on the received intent of the new question, and
  - presenting the second response to the user or another user as a response from the first chatbot.

15. The computer system of claim 14, wherein the determining the distances between the second sentence vector and the averages of the groups of sentence vectors in the memory cache includes the computer system reducing the dimensions of the second sentence vector and the sentence vectors in the memory cache by using the dimension reduction technique.

16. The computer system of claim 13, wherein the method further comprises:
- the computer system calculating a first sentence vector specified by the question;
- the computer system storing the first sentence vector in the memory cache in the association among the question, the second chatbot, the second amount of confidence, and the second intent;
- the computer system receiving a second question as natural language input from the application or another application to the first chatbot;
- the computer system calculating a second sentence vector specified by the second question;
- the computer system determining that the second sentence vector does not match any sentence vector stored in the memory cache;
- based on the second sentence vector not matching any sentence vector stored in the memory cache, the computer system executing the first natural language classifier, which generates an intent of the second question and an amount of confidence that the intent of the second question is an actual intent of the second question;
- the computer system determining that the amount of confidence that the intent of the second question in the actual intent of the second question exceeds the threshold amount of confidence; and
- based on the first amount of confidence of the intent of the second question exceeding the threshold amount of confidence, the computer system storing the intent of the second question in the memory cache in another association among the second question, the second sentence vector, the first chatbot, and the amount of confidence of the intent of the second question, generating a second response to the second question based on the intent of the second question, and presenting the second response to the user or another user as a response from the first chatbot.

17. The computer system of claim 13, wherein the method further comprises:
- the computer system receiving a new question as natural language input from the application or another application to the first chatbot;
- the computer system calculating a second sentence vector specified by the new question;
- the computer system determining distances between the second sentence vector and averages of groups of sentence vectors in the memory cache, the groups of sentence vectors being associated with respective chatbots in the group of chatbots;
- the computer system determining a minimum distance among the distances;
- the computer system identifying a chatbot in the group of chatbots based on the identified chatbot being associated with the minimum distance;
- the computer system determining that the identified chatbot is the first chatbot;
- based on the identified chatbot being the first chatbot, the computer system retrieving an intent of the new question from the memory cache, the retrieved intent being associated with the second sentence vector in the memory cache; and
- based the retrieved intent of the new question, the computer system generating a second response to the new question and presenting the second response to the user or another user as a response from the first chatbot.

* * * * *